(12) United States Patent
Lee et al.

(10) Patent No.: US 9,823,518 B2
(45) Date of Patent: Nov. 21, 2017

(54) DISPLAY DEVICE AND ELECTRONIC DEVICE INCLUDING THE SAME

(71) Applicant: Samsung Electronics Co., Ltd, Gyeonggi-do (KR)

(72) Inventors: Dong-Seop Lee, Seoul (KR); Hee Ryoul Choi, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/365,874

(22) Filed: Nov. 30, 2016

(65) Prior Publication Data

US 2017/0153473 A1    Jun. 1, 2017

(30) Foreign Application Priority Data

Nov. 30, 2015    (KR) .......................... 10-2015-0168974

(51) Int. Cl.

| | |
|---|---|
| *H01L 51/52* | (2006.01) |
| *G02F 1/1339* | (2006.01) |
| *G02F 1/1368* | (2006.01) |
| *G02F 1/1333* | (2006.01) |
| *G02F 1/1335* | (2006.01) |
| *G02F 1/1343* | (2006.01) |

(52) U.S. Cl.
CPC .......... *G02F 1/1339* (2013.01); *G02F 1/1368* (2013.01); *G02F 1/133308* (2013.01); *G02F 1/1343* (2013.01); *G02F 1/133514* (2013.01); *G02F 1/133528* (2013.01); *G02F 2001/133331* (2013.01); *G02F 2201/36* (2013.01); *G02F 2202/28* (2013.01)

(58) Field of Classification Search
CPC . H01L 51/529; H01L 51/5237; H01L 51/525; H01L 51/5253
See application file for complete search history.

(56) References Cited

U.S. PATENT DOCUMENTS

| | | | |
|---|---|---|---|
| 8,325,320 B2 | 12/2012 | Lee et al. | |
| 9,620,742 B2 * | 4/2017 | Kim | ...................... H01L 51/529 |
| 9,698,380 B2 * | 7/2017 | Cheng | ................ H01L 51/5253 |
| 2012/0127697 A1 * | 5/2012 | Kim | ........................ B32B 37/26 |
| | | | 362/97.2 |

FOREIGN PATENT DOCUMENTS

| | | |
|---|---|---|
| KR | 1020080066401 | 7/2008 |
| KR | 1020140085907 | 7/2014 |
| KR | 1020140136725 | 12/2014 |

* cited by examiner

*Primary Examiner* — Cuong Q Nguyen

(57) ABSTRACT

A display device and an electronic device including the same are provided. The electronic device includes a display, a window, and a bonding member. The display includes a plurality of sides. The window includes an internal area of an inside coupled with the plurality of sides and an external area of an outside of the internal area. The bonding member includes an air path formed in the plurality of sides and at least a partial area of the external area, and adapted to a flow of air between the internal area and an external area of the display in at least a part coupled with the plurality of sides.

20 Claims, 17 Drawing Sheets

DISPLAY DEVICE AND ELECTRONIC DEVICE INCLUDING THE SAME

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Nov. 30, 2015 and assigned Serial No. 10-2015-0168974, the contents of which are herein incorporated by reference.

TECHNICAL FIELD

The present disclosure relates to a display device and an electronic device including the same.

BACKGROUND

Displays commonly used in the making of electronic devices often include Thin Film Transistor-Liquid Crystal Displays (TFT-LCDs) and Active Matrix Organic Light Emitting Diodes (AMOLEDs). The AMOLEDs are mainly being used for high-class models, while the TFT-LCDs are being used across the spectrum ranging from low price products up to high price products.

To improve the characteristic of exterior light reflection of the TFT-LCD and the aesthetics thereof, a cover window can be bonded to the TFT-LCD using an optical clear adhesive or an optical clear resin.

As an alternative to using a separate optical bonding film, for example, for the bonding of the cover window, the TFT-LCD can make use of the class of tapes capable of forming an air gap between the cover window and a surface of the TFT-LCD.

SUMMARY

An electronic device designed to attach a cover window and a TFT-LCD by means of a double-sided tape, etc. can cause several problems in structure.

The deformation of a glass taking place at a time the cover window is pressed, a liquid crystal characteristic of the TFT-LCD, a surface characteristic of a polarization plate, etc. can lead to the occurrence of oiling expressed as a watermark and a pooling phenomenon in which a liquid crystal layer is wavy and appears like a wave around a point at which the cover window is pressed with a user's hand, for example.

To address the above-discussed deficiencies, it is a primary object to provide a display device and an electronic device configured to improve the watermark formation problem and/or reduce or prevent the pooling phenomenon.

An electronic device according to various exemplary embodiments of the present disclosure includes a display, a window, and a bonding member. The display includes a plurality of sides. The window includes an internal area of an inside coupled with the plurality of sides and an external area of an outside of the internal area. The bonding member includes an air path formed in the plurality of sides and at least a partial area of the external area, and adapted to a flow of air between the internal area and an external area of the display in at least a part coupled with the plurality of sides.

A display device according to various exemplary embodiments of the present disclosure includes a cover window, a display, and a bonding part. The display is positioned under the cover window, and includes a polarization plate. The bonding part is disposed between the cover window and the display. The polarization plate includes a first edge, a second edge, and a third edge each having a different slope.

An electronic device according to various exemplary embodiments of the present disclosure includes a display device, and a processor. The processor is operatively coupled with the display device. The display device includes a cover window, a display arranged under the cover window, and including a polarization plate, and a bonding part arranged between the cover window and the display. The polarization plate includes a first edge, a second edge, and a third edge each having a different slope.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
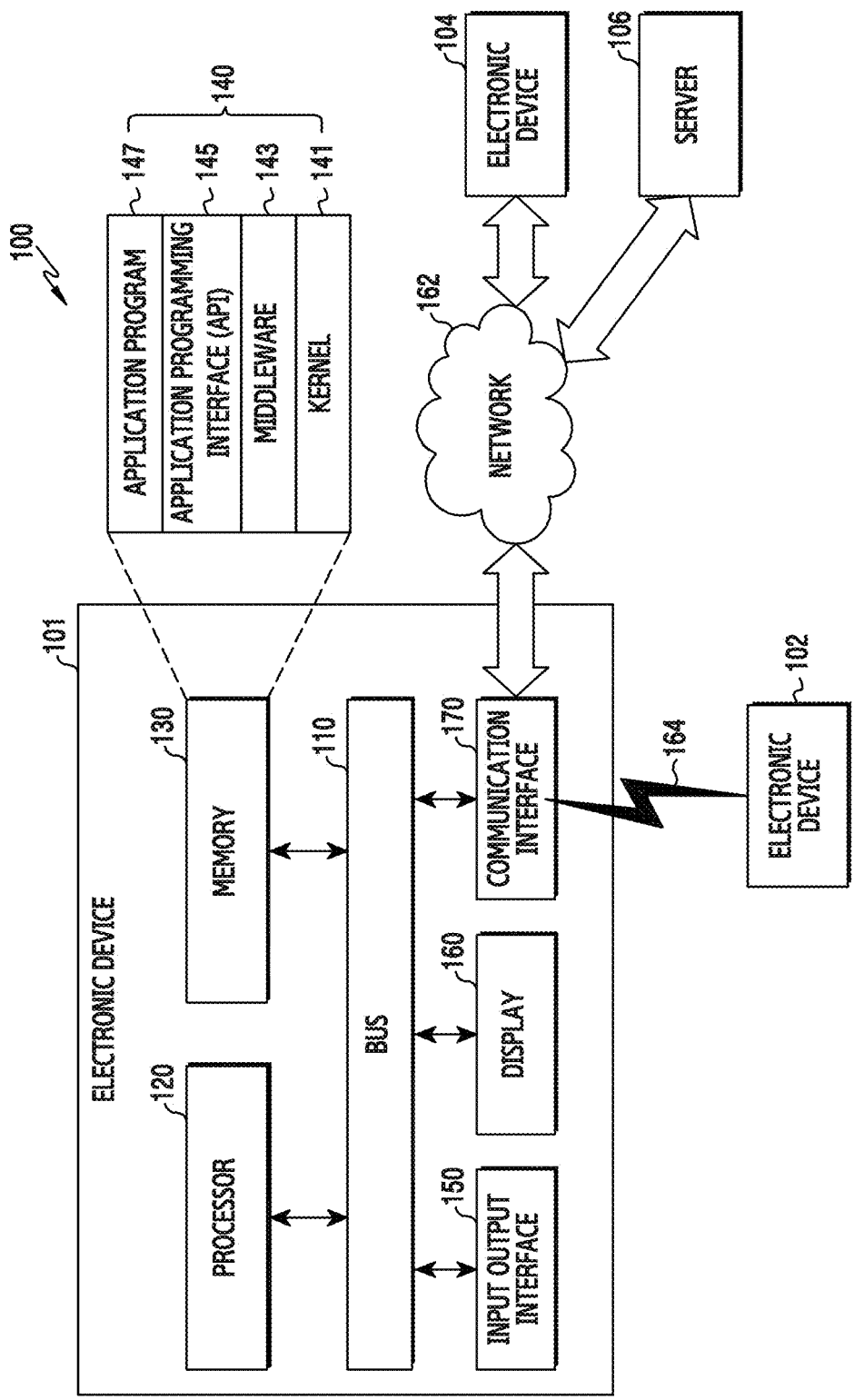
FIG. 1 illustrates a network environment system according to various exemplary embodiments.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Various embodiments of the present document are mentioned below with reference to the accompanying drawings. However, these do not intend to limit the technology mentioned in the present document to a specific embodiment form, and should be understood to include various modifications, equivalents and/or alternatives of the various exemplary embodiments of the present document. In relation to a description of the drawing, like reference symbols can denote like constituent elements.

In the present document, the expressions "have", "can have", "comprise", "can comprise", etc. indicate the existence of a corresponding feature (e.g., a numeral value, a function, an operation, or a constituent element such as a component, etc.), and do not exclude the existence of an additional feature.

In the present document, the expressions "A or B", "at least one of A or/and B", "one or more of A or/and B", etc. can include all available combinations of items enumerated together. For example, "A or B", "at least one of A and B", or "at least one of A or B" can denote all of the cases of (1) including at least one A, (2) including at least one B, or (3) including all of at least one A and at least one B.

The expressions "1st", "2nd", "first", "second", etc. used in the present document can modify various constituent elements irrespective of order and/or importance, and are just used to distinguish one constituent element from another constituent element and do not limit the corresponding constituent elements. For example, a first user device and a second user device can represent different user devices regardless of order or importance. For example, a first constituent element can be named a second constituent element without departing from the scope of right mentioned in the present document and similarly, even the second constituent element can be interchangeably named the first constituent element.

When it is mentioned that any constituent element (e.g., a first constituent element) is "(operatively or communicatively) coupled with/to" or is "connected to" another constituent element (e.g., a second constituent element), it will have to be understood that the any constituent element can be directly coupled to the another constituent element, or be coupled to the another constituent element through a further constituent element (e.g., a third constituent element). On the other hand, when it is mentioned that any constituent element (e.g., a first constituent element) is "directly coupled" or is "directly connected" to another constituent element (e.g., a second constituent element), it can be understood that a further constituent element (e.g., a third constituent element) does not exist between the any constituent element and the another constituent element.

The expression "configured (or set) to~" used in the present document can be used interchangeably with, for example, "suitable for~", "having the capacity to~", "designed to~", "adapted to~", "made to~", or "capable of~" in accordance to a situation. The term "configured (or set) to~" may not necessarily mean only "specifically designed to" in hardware. Instead, in any situation, the expression "device configured to~" can represent that the device is "capable of~" together with other devices or components. For example, the phrase "processor configured (or set) to perform A, B, and C" can represent an exclusive processor (e.g., embedded processor) for performing a corresponding operation, or a generic-purpose processor (e.g., a Central Processing Unit (CPU) or an Application Processor (AP)) capable of performing corresponding operations by executing one or more software programs stored in a memory device.

The terms used in the present document are used to just describe specific exemplary embodiments, and may not have an intention to limit the scope of various other embodiments. For example, the expression of a singular form can include the expression of a plural form unless the disclosure or corresponding description clearly dictates otherwise. The terms used herein inclusive of technological or scientific terms can have the same meaning as those commonly understood by a person having ordinary knowledge in the art mentioned in the present document. Among the terms used in the present document, the terms defined in a general dictionary can be interpreted as the same or similar meanings as the contextual meanings of a related technology, and are not interpreted as ideal or excessively formal meanings unless defined clearly in the present document. According to cases, even the term defined in the present document cannot be interpreted to exclude exemplary embodiments of the present document.

An electronic device according to various exemplary embodiments of the present document can include at least one of a smart phone, a tablet Personal Computer (PC), a mobile phone, a video phone, an electronic book (e-book) reader, a desktop Personal Computer (PC), a laptop PC, a netbook computer, a workstation, a server, a Personal Digital Assistant (PDA), a Portable Multimedia Player (PMP), a Moving Picture Experts Group (MPEG-1 or MPEG-2) Audio Layer 3 (MP3) player, a mobile medical instrument, a camera, or a wearable device, for example. According to various exemplary embodiments, the wearable device can include at least one of an accessory type (e.g., a watch, a ring, a wristlet, an anklet, a necklace, glasses, a contact lens, or a Head-Mounted-Device (HIVID)), a fabric or clothing integrated type (e.g., electronic clothes), a body mount type (e.g., a skin pad or tattoo), or a bio implantation type (e.g., an implantable circuit).

In some exemplary embodiments, the electronic device can be a home appliance. The home appliance can, for example, include at least one of a television (TV), a Digital Video Disk (DVD) player, an audio system, a refrigerator, an air conditioner, a cleaner, an oven, a microwave, a washing machine, an air cleaner, a set-top box, a home automation control panel, a security control panel, a TV box (for example, Samsung HomeSync®, Apple TV®, or Google TV®), a game console (e.g., Xbox®, PlayStation®), an electronic dictionary, an electronic locking system, a camcorder, or an electronic frame.

In another exemplary embodiment, the electronic device can include at least one of various medical instruments (e.g., various portable medical measurement instruments (i.e., a blood sugar measuring instrument, a heartbeat measuring instrument, a blood pressure measurement instrument, a body temperature measurement instrument, etc.), Magnetic Resonance Angiography (MRA), Magnetic Resonance Imaging (MM), Computerized Tomography (CT), a photographing machine, an ultrasonic machine, etc.), a navigation device, a Global Navigation Satellite System (GNSS), an Event Data Recorder (EDR), a Flight Data Recorder (FDR), a car infotainment device, an electronic equipment for ship (e.g., a navigation device for ship, a gyrocompass, etc.), avionics, a security instrument, a head unit for car, an industrial or home robot, an Automatic Teller's Machine (ATM) of a financial institution, a Point Of Sales (POS) of a shop, or an Internet of Things (IoT) device (e.g., an electric bulb, various sensors, an electricity or gas meter, a sprinkler device, a fire alarm, a thermostat, a streetlight, a toaster, an exerciser, a hot water tank, a heater, a boiler, etc.).

According to various exemplary embodiments of the present disclosure, the electronic device can include at least one of a part of furniture or building/structure, an electronic board, an electronic signature receiving device, a projector, or various metering instruments (e.g., tap water, electricity, gas, a radio wave metering instrument, etc.). In various embodiments of the present disclosure, the electronic device can be a combination of one or more of the aforementioned devices. The electronic device according to various embodiments can be a flexible electronic device. Also, the electronic device according to various embodiments of the present document is not limited to the aforementioned instruments, and can include a new electronic device according to the development of a technology and as would be understood to be covered by the person of ordinary skill in the art.

An electronic device according to various embodiments of the present disclosure is described below with reference to the accompanying drawings. In the present document, the term 'user' can denote a person who uses the electronic device or a device (e.g., an artificial-intelligent electronic device) which uses the electronic device.

Referring to FIG. 1, an electronic device 101 within a network environment 100 in various exemplary embodiments is mentioned. The electronic device 101 can include a bus 110, a processor 120, a memory 130, an input output interface 150, a display 160, and a communication interface 170. In any exemplary embodiment, the electronic device 101 can omit at least one of the constituent elements or additionally have another constituent element.

The bus 110 can, for example, include a circuit coupling the constituent elements 110 to 170 with one another and forwarding communication (e.g., a control message and/or data) between the constituent elements.

The processor 120 can include one or more of a Central Processing Unit (CPU), an Application Processor (AP), or a Communication Processor (CP). The processor 120 can, for example, execute computation or data processing for control and/or communication of at least one otherwise constituent element of the electronic device 101.

The memory 130 can include a volatile and/or non-volatile memory. The memory 130 can, for example, store an instruction or data related with at least one otherwise constituent element of the electronic device 101. According to one exemplary embodiment, the memory 130 can store a software and/or program 140. The program 140 can, for example, include a kernel 141, a middleware 143, an Application Programming Interface (API) 145, an application program (or "application") 147, etc. At least a part of the kernel 141, the middleware 143, or the API 145 can be called an Operating System (OS).

The kernel 141 can, for example, control or manage system resources (e.g., the bus 110, the processor 120, the memory 130, etc.) that are used for executing operations or functions implemented in other programs (e.g., the middleware 143, the API 145, or the application program 147). Also, the kernel 141 can provide an interface capable of controlling or managing the system resources by enabling the middleware 143, the API 145, or the application program 147 to gain access to the individual constituent element of the electronic device 101.

The middleware 143 can, for example, perform a relay role of enabling the API 145 or the application program 147 to communicate and exchange data with the kernel 141.

Also, the middleware 143 can process one or more work requests received from the application program 147 in accordance with the order of priority. For example, the middleware 143 can grant the order of priority capable of using the system resources (e.g., the bus 110, the processor 120, the memory 130, etc.) of the electronic device 101 to at least one of the application programs 147. For instance, the middleware 143 can perform scheduling, load balancing, etc. for the one or more work requests, by processing the one or more work requests in accordance with the priority order granted to the at least one of the application programs 147.

The API 145 is, for example, an interface enabling the application program 147 to control a function of the kernel 141 or the middleware 143, and can, for example, include at least one interface or function (e.g., an instruction) for file control, window control, image processing, character control, etc.

The input output interface 150 can, for example, play a role of an interface capable of forwarding an instruction or data inputted from a user or another external device, to the other constituent element(s) of the electronic device 101. Also, the input output interface 150 can output an instruction or data received from the other constituent element(s) of the electronic device 101, to the user or another external device.

The display 160 can, for example, include a Liquid Crystal Display (LCD), a Light Emitting Diode (LED) display, an Organic Light Emitting Diode (OLED) display, or a MicroElectroMechanical Systems (MEMS) display, or an electronic paper display. The display 160 can, for example, display various contents (e.g., a text, an image, a video, an icon, a symbol, etc.) to a user. The display 160 can include a touch screen and, for example, can receive a touch, gesture, proximity, or hovering input that uses an electronic pen or a part of the user's body.

The communication interface 170 can, for example, establish communication between the electronic device 101 and an external device (e.g., a first external electronic device 102, a second external electronic device 104, or a server 106). For example, the communication interface 170 can be coupled to a network 162 through a wireless communication or wired communication, and communicate with the external device (e.g., the second external electronic device 104 or server 106).

The wireless communication is, for example, a cellular communication protocol and can, for example, use at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), etc. Also, the wireless communication can, for example, include a short-range communication 164. The short-range communication 164 can, for example, include at least one of Wireless Fidelity (WiFi), Bluetooth (BT), Near Field Communication (NFC), Global Navigation Satellite System (GNSS), etc. In accordance with a use area, a bandwidth, etc., the GNSS can, for example, include at least one of a Global Positioning System (GPS), a Global navigation satellite system (Glonass), a Beidou navigation satellite system (hereinafter, "Beidou"), Galileo, or the European global satellite-based navigation system. Below, in the present document, the "GPS" can be used interchangeably with the "GNSS". The wired communication can, for example, include at least one of a Universal Serial Bus (USB), a High Definition Multimedia Interface (HDMI), a Recommended Standard-232 (RS-232), a Plain Old Telephone Service (POTS), etc. The network 162 can include at least one of a telecommunications network, for example, a computer network (e.g., Local Area Network (LAN) or Wide Area Network (WAN)), the Internet, or a telephone network.

The first and second electronic devices 102 and 104 each can be a device of a kind identical with or different from that of the electronic device 101. According to one exemplary embodiment, the server 106 can include a group of one or more servers. According to various exemplary embodiments, all or some of operations executed in the electronic device 101 can be executed in another or a plurality of electronic devices (e.g., the first and second electronic device 102 and 104 or the server 106). According to one exemplary embodiment, in case where the electronic device 101 has to perform any function or service automatically or in response to a request, the electronic device 101 can request at least a partial function associated with this to another electronic device (e.g., the electronic device 102, 104 or the server 106) instead of or additionally to executing the function or service in itself. The another electronic device (e.g., the electronic device 102, 104 or the server 106) can execute the requested function or additional function, and forward the result to the electronic device 101. The electronic device 101 can process the received result as it is or additionally, and provide the requested function or service. For this, a cloud computing, distributed computing, or client-server computing technology can be used, for example.

Figure 2:
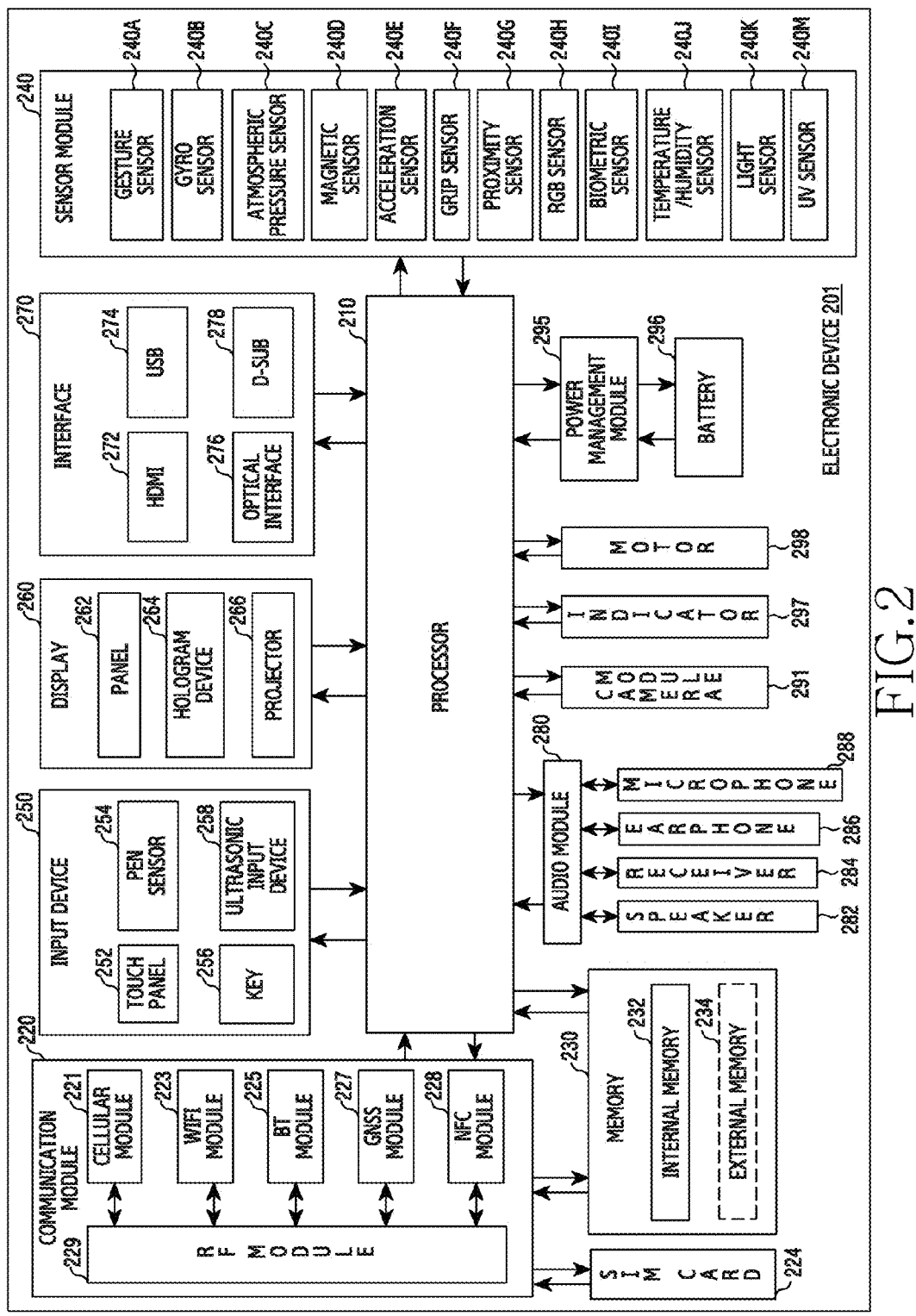
FIG. 2 illustrates a block diagram of an electronic device according to various exemplary embodiments.

FIG. 2 is a block diagram of an electronic device 201 according to various exemplary embodiments. The electronic device 201 can, for example, include the entire or part of the electronic device 101 illustrated in FIG. 1. The electronic device 201 can include one or more processors (e.g., an Application Processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 can, for example, drive an operating system or an application program and control a plurality of hardware or software constituent elements coupled to the processor 210, and can perform various data processing and computation. The processor 210 can be, for example, implemented as a System On Chip (SoC). According to one exemplary embodiment, the processor 210 can further include a Graphical Processing Unit (GPU) and/or an image signal processor. The processor 210 can include at least some (e.g., the cellular module 221) of the constituent elements illustrated in FIG. 2 as well. The processor 210 can load an instruction or data received from at least one of the other constituent elements (e.g., non-volatile memory), to a volatile memory and process the loaded instruction or data, and store various data in the non-volatile memory.

The communication module 220 can have the same or similar construction as the communication interface 170 of FIG. 1. The communication module 220 can, for example, include a cellular module 221, a WiFi module 223, a Bluetooth (BT) module 225, a GNSS module 227 (e.g., a GPS module, a Glonass module, a Beidou module, or a Galileo module), an NFC module 228, and a Radio Frequency (RF) module 229.

The cellular module 221 can, for example, provide voice telephony, video telephony, a text service, an Internet service, etc., through a telecommunication network. According to one exemplary embodiment, the cellular module 221 can, for example, perform the distinction and authentication of the electronic device 201 within a telecommunication network, by using the subscriber identification module (e.g., Subscriber Identification Module (SIM) card) 224. According to one exemplary embodiment, the cellular module 221 can perform at least some functions among functions that the processor 210 can provide. According to one exemplary embodiment, the cellular module 221 can include a Communication Processor (CP).

The WiFi module 223, the Bluetooth module 225, the GNSS module 227 or the NFC module 228 each can, for example, include a processor for processing data transmitted/received through the corresponding module. According to any exemplary embodiment, at least some (e.g., two or more) of the cellular module 221, the WiFi module 223, the Bluetooth module 225, the GNSS module 227 or the NFC module 228 can be included within one Integrated Circuit (IC) or IC package.

The RF module 229 can, for example, transceive a communication signal (e.g., an RF signal). The RF module 229 can, for example, include a transceiver, a Power Amplifier Module (PAM), a frequency filter, a Low Noise Amplifier (LNA), an antenna, etc. According to another exemplary embodiment, at least one of the cellular module 221, the WiFi module 223, the Bluetooth module 225, the GNSS module 227 or the NFC module 228 can transceive an RF signal through a separate RF module.

The subscriber identification module 224 can, for example, include a card and/or embedded SIM including a subscriber identification module, and can include unique identification information (e.g., an Integrated Circuit Card Identifier (ICCID)) or subscriber information (e.g., an International Mobile Subscriber Identity (IMSI)).

The memory 230 (e.g., the memory 130) can, for example, include an internal memory 232 or an external memory 234. The internal memory 232 can, for example, include at least one of a volatile memory (e.g., a Dynamic Random Access Memory (DRAM), a Static RAM (SRAM), a Synchronous Dynamic RAM (SDRAM), etc.), a non-volatile memory (e.g., a One-Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a Not AND (NAND) flash, a Not OR (NOR) flash, etc.), a hard drive, or a Solid State Drive (SSD).

The external memory 234 can further include a flash drive, for example, a Compact Flash (CF), a Secure Digital (SD), a micro-SD, a mini-SD, an extreme Digital (xD), a Multi Media Card (MMC), a memory stick, etc. The external memory 234 can be operatively and/or physically coupled with the electronic device 201 through various interfaces.

The sensor module 240 can, for example, measure a physical quantity or detect an activation state of the electronic device 201, and convert measured or detected information into an electric signal. The sensor module 240 can, for example, include a gesture sensor 240A, a gyro sensor 240B, an air pressure sensor 240C, a magnetic sensor 240D, an acceleration sensor 240E, a grip sensor 240F, a proximity sensor 240G, a color sensor 240H (e.g., a Red, Green, Blue (RGB) sensor), a bio sensor 240I, a temperature/humidity sensor 240I, an illumination sensor 240K, or an Ultra Violet (UV) sensor 240M. Additionally or alternatively, the sensor module 240 can, for example, include an E-nose sensor, an Electromyography (EMG) sensor, an Electroencephalogram (EEG) sensor, an Electrocardiogram (ECG) sensor, an Infra-Red (IR) sensor, an iris scan sensor, and/or a finger scan sensor. The sensor module 240 can further include a control circuit for controlling at least one or more sensors belonging therein. In any exemplary embodiment, the electronic device 201 can further include a processor configured to control the sensor module 240, as a part of the processor 210 or separately from the processor 210, and control the sensor module 240 while the processor 210 is in a sleep state.

The input device 250 can, for example, include a touch panel 252, a (digital) pen sensor 254, a key 256, or an ultrasonic input device 258. The touch panel 252 can, for example, use at least one scheme among a capacitive overlay scheme, a pressure sensitive scheme, an infrared beam scheme, or an ultrasonic scheme. Also, the touch panel 252 can further include a control circuit as well. The touch panel 252 can further include a tactile layer, and provide a tactile response to a user.

The (digital) pen sensor 254 can, for example, be a part of a touch panel, or include a separate sheet for recognition. The key 256 can, for example, include a physical button, an optical key, or a keypad. The ultrasonic input device 258 can detect an ultrasonic wave generated in an input tool, through a microphone (e.g., a microphone 288), and check data corresponding to the detected ultrasonic wave.

The display 260 (e.g., the display 160) can include a panel 262, a hologram device 264, or a projector 266. The panel 262 can include the same or similar construction to the display 160 of FIG. 1. The panel 262 can, for example, be implemented to be flexible, transparent, or wearable. The panel 262 can be constructed as one module, along with the touch panel 252 as well. According to one exemplary embodiment, the panel 262 can include a pressure sensor (or a "force sensor" interchangeably used hereinafter) capable of measuring a pressure intensity of a user's touch. The pressure sensor can be implemented in an integrated type with the touch panel 252, or be implemented as one or more sensors separately from the touch panel 252. The hologram device 264 can use an interference of light to show a three-dimensional image to the air. The projector 266 can project light onto a screen and display an image. The screen can, for example, be located inside or outside the electronic device 201. According to one exemplary embodiment, the display 260 can further include a control circuit for controlling the panel 262, the hologram device 264, or the projector 266.

The interface 270 can, for example, include an HDMI 272, a USB 274, an optical interface 276, or a D-subminiature (D-sub) 278. The interface 270 can, for example, be included in the communication interface 170 illustrated in FIG. 1. Additionally or alternatively, the interface 270 can, for example, include a Mobile High-definition Link (MHL) interface, an SD card/Multi Media Card (MMC) interface, or an Infrared Data Association (IrDA) standard interface.

The audio module 280 can, for example, convert a sound and an electric signal interactively. At least some constituent elements of the audio module 280 can, for example, be included in the input output interface 150 illustrated in FIG. 1. The audio module 280 can, for example, process sound information that is inputted or outputted through a speaker 282, a receiver 284, an earphone 286, the microphone 288, etc.

The camera module 291 is, for example, a device able to take a still picture and a moving picture. According to one exemplary embodiment, the camera module 291 can include one or more image sensors (e.g., a front sensor or a rear sensor), a lens, an Image Signal Processor (ISP), or a flash (e.g., a Light Emitting Diode (LED), a xenon lamp, etc.).

The power management module 295 can, for example, manage electric power of the electronic device 201. According to one exemplary embodiment, the power management module 295 can include a Power Management Integrated Circuit (PMIC), a charger IC, or a battery or fuel gauge. The PMIC can, for example, employ a wired and/or wireless charging method. The wireless charging method can, for example, include a magnetic resonance scheme, a magnetic induction scheme, an electromagnetic wave scheme, etc., and further include a supplementary circuit for wireless charging, for example, a coil loop, a resonance circuit, a rectifier, etc. The battery gauge can, for example, measure a level of the battery 296, a voltage being in charge, a current or a temperature. The battery 296 can, for example, include a rechargeable battery and/or a solar battery.

The indicator 297 can display a specific status of the electronic device 201 or a part (e.g., the processor 210) thereof, for example, a booting state, a message state, a charging state, etc. The motor 298 can convert an electric signal into a mechanical vibration, and can generate a vibration, a haptic effect, etc. Though not illustrated, the electronic device 201 can include a processing device (e.g., a GPU) for mobile TV support. The processing device for mobile TV support can, for example, process media data according to the standards of Digital Multimedia Broadcasting (DMB), Digital Video Broadcasting (DVB), a media flow, etc.

Each of the constituent elements described in the present document can consist of one or more components, and a name of the corresponding constituent element can vary according to the kind of the electronic device. In various exemplary embodiments, the electronic device can include at least one of the constituent elements described in the present document, and can omit some constituent elements or further include additional another constituent element. Also, some of the constituent elements of the electronic device according to various exemplary embodiments can be coupled and constructed as one entity to identically perform the functions of the corresponding constituent elements before combination.

Figure 3:
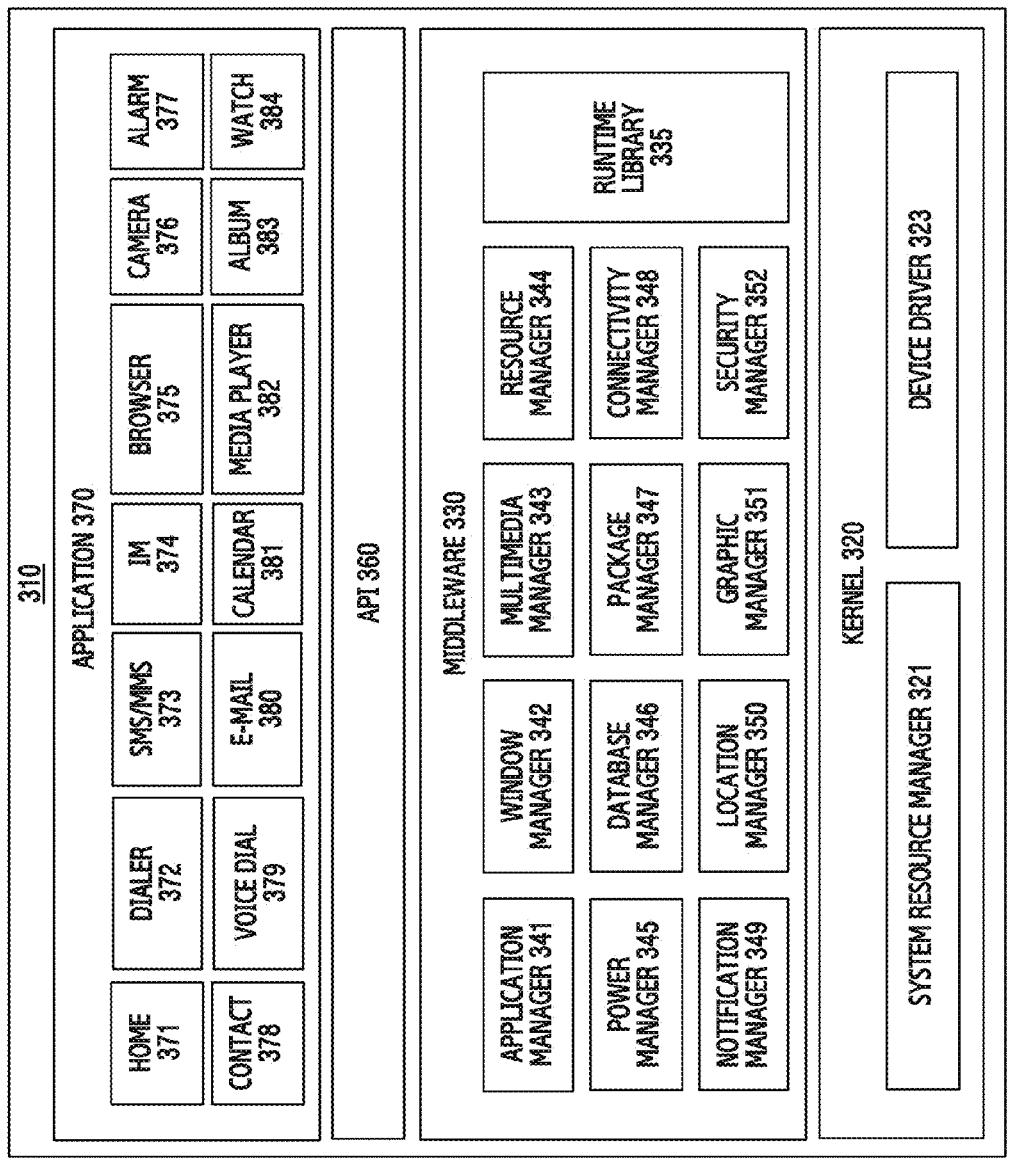
FIG. 3 illustrates a block diagram of a program module according to various exemplary embodiments.

FIG. 3 is a block diagram of a program module according to various exemplary embodiments. According to one exemplary embodiment, the program module 310 (e.g., the program 140) can include an Operating System (OS) controlling resources related to an electronic device (e.g., the electronic device 101) and/or various applications (e.g., the application program 147) run on the operating system. The operating system can, for example, be Android, iPhone OS (iOS), Windows, Symbian, Tizen, Bada, etc.

The program module 310 can include a kernel 320, a middleware 330, an Application Programming Interface (API) 360, and/or an application 370. At least a part of the program module 310 can be preloaded onto an electronic device, or be downloaded from an external electronic device (e.g., the electronic device 102, 104, the server 106, etc.).

The kernel 320 (e.g., the kernel 141) can include a system resource manager 321 and/or a device driver 323. The system resource manager 321 can perform control of a system resource, allocation thereof, recovery thereof, etc. According to one exemplary embodiment, the system resource manager 321 can include a process management unit, a memory management unit, a file system management unit, etc. The device driver 323 can, for example, include a display driver, a camera driver, a Bluetooth driver, a shared memory driver, a USB driver, a keypad driver, a WiFi driver, an audio driver, or an Inter-Process Communication (IPC) driver.

The middleware 330 can, for example, provide a function that the application 370 commonly needs, or provide various functions to the application 370 through the API 360 so that the application 370 may make efficient use of restricted system resources within an electronic device. According to one exemplary embodiment, the middleware 330 (e.g., the middleware 143) can include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 can, for example, include a library module that a compiler uses in order to add a new function through a programming language while the application 370 is executed. The runtime library 335 can perform a function, etc. of input output management, memory management, or an arithmetic function.

The application manager 341 can, for example, manage a life cycle of at least one application among the applications 370. The window manager 342 can manage a GUI resource that a screen uses. The multimedia manager 343 can detect a format necessary for playing various media files, and use a codec suitable to the corresponding format to perform encoding or decoding of the media file. The resource manager 344 can manage a resource such as a source code of at least any one application among the applications 370, a memory thereof, a storage space thereof, etc.

The power manager 345 can, for example, operate together with a Basic Input/Output System (BIOS), etc. to manage a battery or power supply, and provide power information, etc. necessary for an operation of an electronic device. The database manager 346 can create, search or change a database that will be used in at least one application among the applications 370. The package manager 347 can manage installation or updating of an application distributed in a form of a package file.

The connectivity manager 348 can, for example, manage wireless connectivity such as WiFi, Bluetooth, etc. The notification manager 349 can display or notify an event such as an arrival message, an appointment, a proximity notification, etc. the way the event does not disturb a user. The location manager 350 can manage location information of an electronic device. The graphic manager 351 can manage a graphic effect that will be provided to a user, or a user interface related with this. The security manager 352 can provide a general security function necessary for system security, user authentication, etc. According to one exemplary embodiment, if the electronic device (e.g., the electronic device 101) includes a phone function, the middleware 330 can further include a telephony manager for managing a voice or video telephony function of the electronic device.

The middleware 330 can include a middleware module forming a combination of various functions of the aforementioned constituent elements. The middleware 330 can provide a module that is specialized by kind of an operating system so as to provide a differentiated function. Also, the middleware 330 can dynamically delete some of the existing constituent elements or add new constituent elements.

The API 360 (e.g., the API 145) is, for example, a set of API programming functions, and can be provided to have a different construction in accordance with an operating system. For example, Android or iOS can provide one API set on a per-platform basis, and Tizen can provide two or more API sets on a per-platform basis.

The application 370 (e.g., the application program 147) can, for example, include at least one or more applications capable of performing a function of a home 371, a dialer 372, a Short Message Service (SMS)/Multimedia Message Service (MMS) 373, an Instant Message (IM) 374, a browser 375, a camera 376, an alarm 377, a contact 378, a voice dial 379, an electronic mail (e-mail) 380, a calendar 381, a media player 382, an album 383, a watch 384, or health care (e.g., measuring a momentum, a blood sugar, etc.) or environment information provision (e.g., providing air pressure, humidity, temperature information, etc.).

According to one exemplary embodiment, the application 370 can include an application (hereinafter, for description convenience, an "information exchange application") supporting information exchange between an electronic device (e.g., the electronic device 101) and an external electronic device (e.g., the electronic device 102, 104). The information exchange application can, for example, include a notification relay application for relaying specific information to the external electronic device, or a device management application for managing the external electronic device.

For example, the notification relay application can include a function of relaying notification information generated in another application (e.g., an SMS/MMS application, an e-mail application, a health care application, an environment information application, etc.) of the electronic device, to the external electronic device (e.g., the electronic device 102, 104). Also, the notification relay application can, for example, receive notification information from the external electronic device and provide the received notification information to a user.

The device management application can, for example, manage (e.g., install, delete, or update) at least one function (e.g., turn-on/turn-off of the external electronic device itself or some constituent components thereof or adjustment of a brightness or resolution of a display) of the external electronic device (e.g., the electronic device 102, 104) communicating with the electronic device, an application operating in the external electronic device, or a service (e.g., a telephony service, a message service, etc.) provided in the external electronic device.

According to one exemplary embodiment, the application 370 can include an application (e.g., a health care application, etc. of a mobile medical instrument) designated according to an attribute of the external electronic device (e.g., the electronic device 102, 104). According to one exemplary embodiment, the application 370 can include an application received from the external electronic device (e.g., the server 106 or the electronic device 102, 104). According to one exemplary embodiment, the application 370 can include a preloaded application, or a third party application downloadable from a server. Names of the constituent elements of the program module 310 according to the illustrated exemplary embodiment can be different according to the kind of an operating system.

According to various exemplary embodiments, at least a part of the program module 310 can be implemented by software, firmware, hardware, or a combination of at least two or more of them. At least a part of the program module 310 can, for example, be implemented (i.e., executed) by a processor (e.g., the processor 210). At least a part of the program module 310 can include, for example, a module, a program, a routine, sets of instructions, a process, etc. for performing one or more functions.

The term "module" used in the present document can, for example, mean a unit including one of hardware, software, or firmware or a combination of two or more of them. The "module" can, for example, be used interchangeably with the terms "unit", "logic", "logical block", "component", "circuit", etc. The "module" can be the minimum unit of an integrally constructed component or a part thereof. The "module" can be the minimum unit performing one or more functions or a part thereof as well. The "module" can be implemented mechanically or electronically. For example, the "module" can include at least one of an Application-Specific Integrated Circuit (ASIC) chip performing some operations, which are well known to the art or will be developed in the future, a Field—Programmable Gate Array (FPGA), or a programmable-logic device.

At least a part of a device (e.g., modules or functions thereof) or method (e.g., operations) according to various exemplary embodiments can, for example, be implemented as an instruction that is stored in a computer-readable storage media in a form of a program module. If the instruction is executed by a processor (e.g., the processor 120), the processor can perform a function corresponding to the instruction. The computer-readable storage media can be the memory 130, for example.

The computer-readable recording media can include a hard disk, a floppy disk, a magnetic media (e.g., a magnetic tape), an optical media (e.g., a Compact Disc - Read Only Memory (CD-ROM), a Digital Versatile Disk (DVD), a Magneto-Optical Media (e.g., a floptical disk), a hardware device (e.g., a Read Only Memory (ROM), a Random Access Memory (RAM), a flash memory, etc.). Also, the program instruction can include a high-level language code that uses an interpreter, etc. to be executable by a computer, as well as a mechanical language code such as a code made by the compiler. The aforementioned hardware device can be configured to operate as one or more software modules so as to perform operations of various exemplary embodiments, and vice versa.

The module or program module according to various exemplary embodiments can further include at least one or more of the aforementioned constituent elements, or omit some of them, or further include additional other constituent elements. Operations carried out by the module, the program module or the other constituent elements according to various exemplary embodiments can be executed in a sequential, parallel, repeated or heuristic method. Also, some operations can be executed in different order or can be omitted, or other operations can be added.

Figure 4:
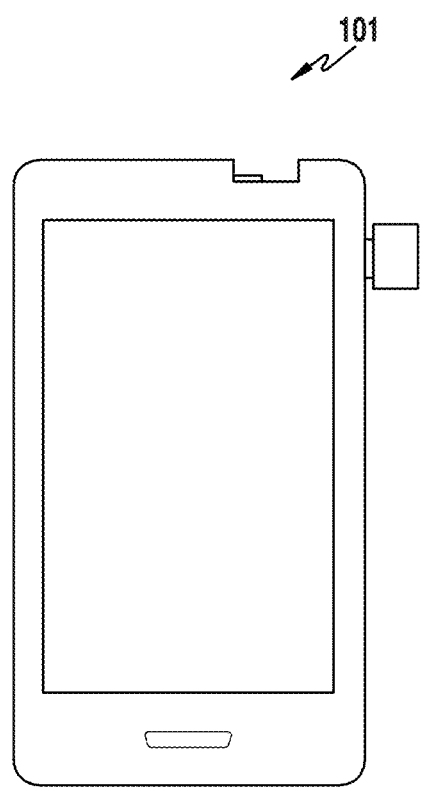
FIG. 4 illustrates a front view of an electronic device according to various exemplary embodiments.
Figure 5:
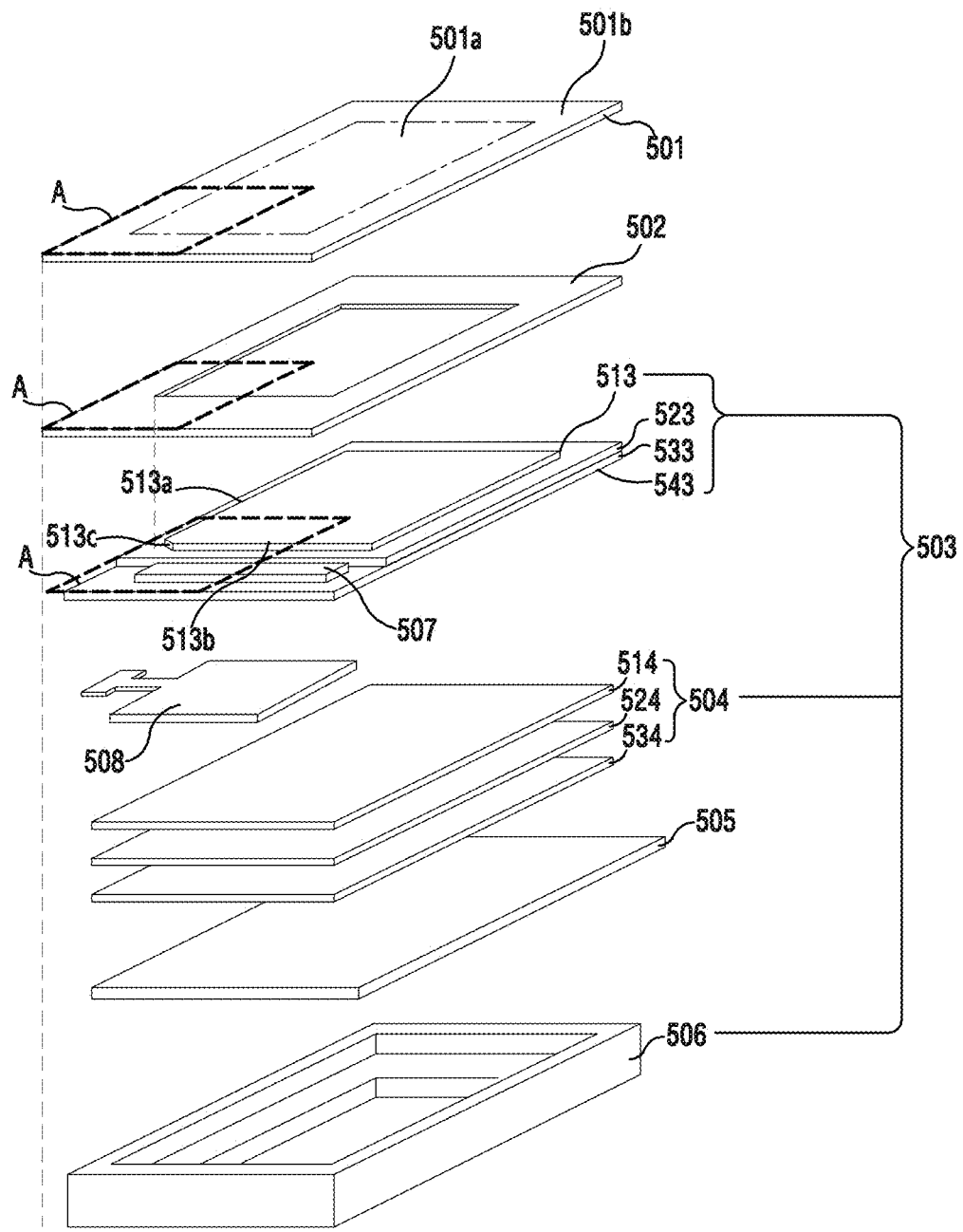
FIG. 5 illustrates an exploded view of a construction of an electronic device according to various exemplary embodiments.
Figure 6:
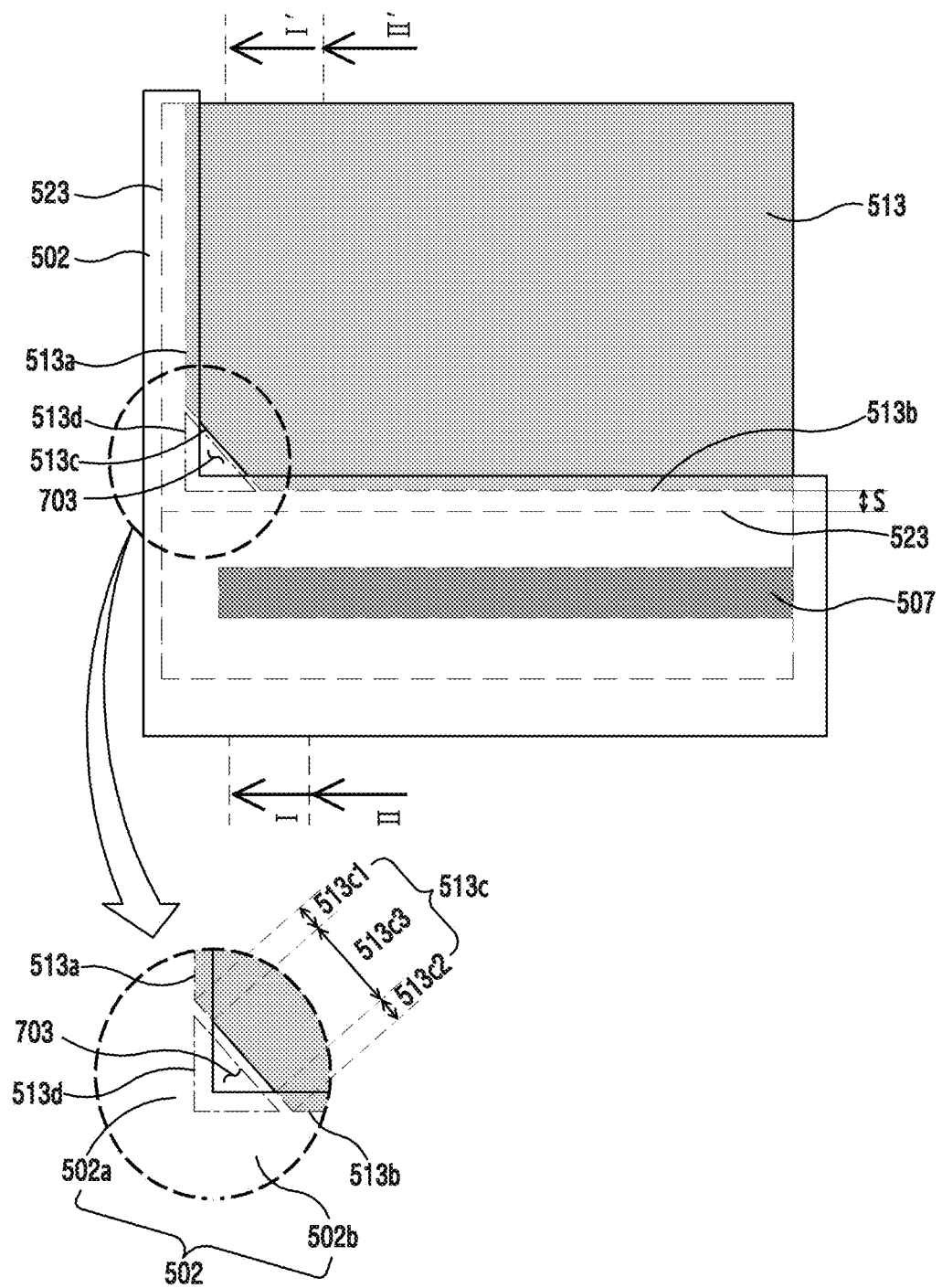
FIG. 6 illustrates an enlarged view of a portion 'A' of FIG. 5.
Figure 7:
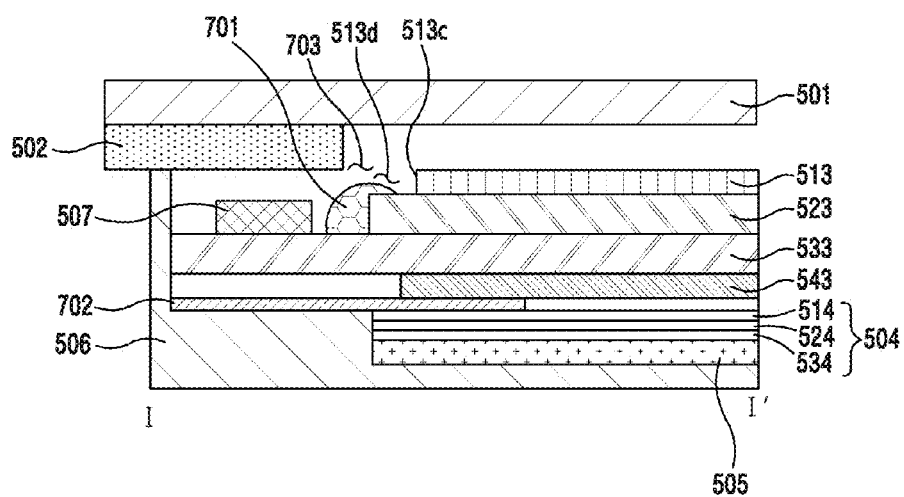
FIG. 7 illustrates a section taken along line I-I' of FIG. 6.
Figure 8:
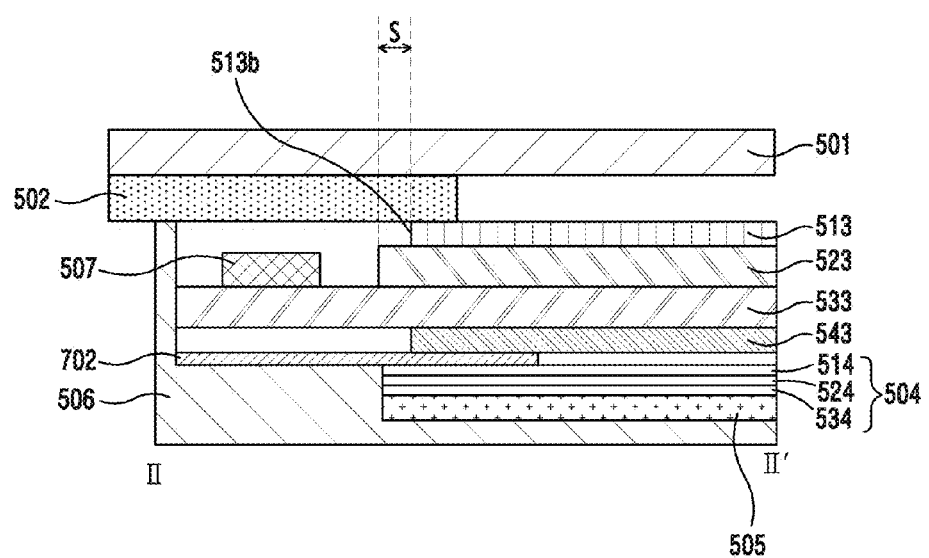
FIG. 8 illustrates a section taken along line II-II' of FIG. 6.

FIG. 4 illustrates a front view of an electronic device according to various exemplary embodiments. FIG. 5 illustrates an exploded view of a construction of the electronic device according to various exemplary embodiments. FIG. 6 illustrates an enlarged view of a portion 'A' of FIG. 5. FIG. 7 illustrates a section taken along line I-I' of FIG. 6. FIG. 8 illustrates a section taken along line II-II' of FIG. 6.

As illustrated in FIG. 4 and FIG. 5, the electronic device 101 according to various exemplary embodiments can, for example, include a cover window 501, a bonding part 502, a display 503, a driving chip 507, and a flexible circuit substrate 508.

The cover window 501 can protect an internal construction of the electronic device 101. The cover window 501 transmits internal light generated within the electronic device 101, to the external. Also, the cover window 501 can transmit external light traveling from the outside of the electronic device 101, inside the electronic device 101. The cover window 501 can be formed of materials having excellent light transmission, heat resistance, chemical resistance, mechanical strength, etc. Here, the cover window 501 can be a transparent film or glass substrate formed of polyethyleneterephthalate, etc., and can be a plastic substrate formed of polymethylmethacrylate, polyamide, polyimide, polypropylene, polyurethane, etc. as well.

According to various exemplary embodiments, the cover window 501 can further have the touch panel 252 capable of sensing a touch occurring on a surface thereof. The touch panel 252 can correspond to the touch panel 252 described in FIG. 2. The touch panel 252 can, for example, sense a touch by using at least one of a capacitive overlay scheme, a pressure sensitive scheme, an infrared beam scheme, or an ultrasonic scheme.

According to various exemplary embodiments, the bonding part 502 can be arranged between the cover window 501 and the display 503. The bonding part 502 can adhere the cover window 501 and the display 503 to each other. The bonding part 502 can have the characteristic of a bonding agent. That is, the bonding part 502 can have the characteristic of the bonding agent not easily detaching if once attaching. Or, the bonding part 502 can have the characteristic of an adhesive agent as well. That is, the bonding part 502 can have the characteristic of the adhesive agent capable of easily detaching within a proper time granted once attaching. The bonding part 502 can fix the cover window 501 and the display 503 to each other. Or, the bonding part 502 can maintain a gap between the cover window 501 and the display 503. The bonding part 502 can get in contact with the cover window 501 and a first polarization plate 513 of the display 503. The bonding part 502 can be of a frame form whose central area is opened. The bonding part 502 can seal up a space between the cover window 501 and the display 503 so that foreign materials such as dusts, moisture, etc. may not enter the space between the cover window 501 and the display 503.

The display 503 can correspond to the display 260 described in FIG. 2. The display 503, which is an internal construction of the electronic device 101, can perform a practical operation in the electronic device 101. The display 503 can perform a function of displaying an image.

According to various exemplary embodiments, the display 503 can include a plurality of sides. The display 503 can include one or more corners formed by the meeting of two or more sides among the plurality of sides. The display 503 can include a cutting area 513d formed by cutting out at least one corner among the one or more corners. That is, the display 503 can include the cutting area 513d that is a cut-out portion of the display 503.

Meanwhile, the cover window 501 can include an internal area 501a arranged inside coupled with the plurality of sides of the display 503, and an external area 501b arranged outside the internal area 501a. According to various exemplary embodiments, the display 503 can include a frame mold 506, a light guide plate 505, optical sheets 504, a first substrate 523, a second substrate 533, the driving chip 507, the flexible circuit substrate 508, the first polarization plate 513, and a second polarization plate 543. The frame mold 506 can fix the internal construction of the electronic device 101. The frame mold 506 can accommodate and fix the display 503. The frame mold 506 can be implemented in a form for protecting an internal construction of the display 503. The frame mold 506 can be formed of synthetic resins and, for instance, can be formed of metal materials such as stainless steel, titanium (Ti), etc.

The light guide plate 505 outputs internal light generated from a light source (not shown), toward the cover window 501. Here, the light guide plate 505 can be formed of transparent substance of a plastic series such as acrylic. And, the light source can be a line light source of a Cold Cathode Fluorescent Lamp (CCFL), a Hot Cathode Fluorescent Lamp (HCFL), etc., and can be a point light source of a Light Emitting Diode (LED), etc. as well.

According to various exemplary embodiments, the optical sheets 504 can make light emitted from the light guide plate 505 incident to the first substrate 523 and the second substrate 533. The optical sheets 504 can include a diffuser sheet 534, a prism sheet 524, a protection sheet 514, etc. The diffuser sheet 534 can diffuse light. The prism sheet 524 can convert a traveling angle of light so that light may be vertical to the first substrate 523 or the second substrate 533. The protection sheet 514 can protect a surface of the prism sheet 524.

A bonding tape 702 can be arranged on the optical sheets 504. The bonding tape 702 can fix the internal constructions of the display 503. Also, the bonding tape 702 can prevent light emitted from the light guide plate 505 from leaking out from the display 503, by performing light shielding.

The first substrate 523 can be arranged on the second substrate 533. The first substrate 523 can, for example, be a color filter substrate (or a color filter glass). The first substrate 523 can include a black matrix, a color filter, etc. The first substrate 523 can provide internal light traveling through a liquid crystal, in a constant color. This first substrate 523 can consist of a plurality of RGB pixels for allowing internal light to exhibit a constant color.

The second substrate 533 can be arranged above the light guide plate 505 and the optical sheets 504. The second substrate 533 can, for example, be a thin film transistor substrate (or a TFT glass). The second substrate 533 can form a thin film transistor, a pixel electrode coupled to the thin film transistor, a common electrode, etc. thereon. The liquid crystal can be interposed between the first substrate 523 and the second substrate 533. The type of the display 503 can be determined depending on the kind of the liquid crystal. The second substrate 533 can vary an array of the liquid crystal so as to change a light transmittance of internal light transmitted in the light guide plate 505. The second substrate 533 can deliver internal light in a desired shape through the liquid crystal.

The driving chip (i.e., a Display Driver IC (DDI)) 507 capable of driving the display 503 can be arranged on the second substrate 533. The driving chip 507 can be bonded onto the second substrate 533 through an anisotropic conductive film, etc. This driving chip 507 can be electrically coupled with a Flexible Printed Circuit Board (FPCB) 508.

According to various exemplary embodiments, the first polarization plate 513 is arranged on the first substrate 523. The second polarization plate 543 can be arranged beneath the second substrate 533. The first polarization plate 513 and the second polarization plate 543 can transform light incident as vibrating in several directions, into light (i.e., polarized light) vibrating in one direction only. The first polarization plate 513 and the second polarization plate 543 can be attached to the first substrate 523 and the second substrate 533 by a bonding tape, respectively.

According to various exemplary embodiments, the first polarization plate 513 can include a first edge 513a, a second edge 513b, and a third edge 513c. The first edge 513a can be a long side of the first polarization plate 513. The second edge 513b can be a short side of the first polarization plate 513. The third edge 513c can be located between the first edge 513a and the second edge 513b. The third edge 513c can couple the first edge 513a and the second edge 513b. The third edge 513c can be arranged adjacent to the driving chip 507. That is, the third edge 513c can be arranged at a corner adjacent to the driving chip 507 among corners of the first polarization plate 513.

According to various exemplary embodiments, the first polarization plate 513 can include a plurality of sides. The first polarization plate 513 can include one or more corners formed by the meeting of two or more sides among the plurality of sides. The first polarization plate 513 can include the cutting area 513d formed by cutting out at least one corner among the one or more corners. That is, the cutting area 513d is a portion that is cut out from the first polarization plate 513. For example, the cutting area 513d can be of a triangle shape.

According to various exemplary embodiments, at least one or more third edges 513c can be provided in the first polarization plate 513. That is, in the drawing, it is illustrated that the third edge 513c is provided in one corner of the first polarization plate 513, but an exemplary embodiment is not limited to this and the third edge 513c can be provided in at least one or more of positions of the corners of the first polarization plate 513. Preferably, the third edge 513c can be provided in one or two positions among positions of four corners of the first polarization plate 513.

The first edge 513a, the second edge 513b, and the third edge 513c can have different slopes, respectively. The third edge 513c can have a slope different from slopes of the adjacent first edge 513a and second edge 513b. For example, the third edge 513c can include a straight line. At this time, the third edge 513c can form a diagonal line with the first edge 513a and the second edge 513b.

As illustrated in FIG. 6 and FIG. 7, the bonding part 502 can be adhered to the first edge 513a and the second edge 513b. The bonding part 502 can be adhered to a part of the third edge 513c. The bonding part 502 can be adhered to both ends of the third edge 513c. That is, the bonding part 502 can be overlapped with a part of the third edge 513c. The bonding part 502 can expose the remnant of the third edge 513c, instead of being adhered to the remnant of the third edge 513c. That is, a central part of the third edge 513c may not be overlapped with the bonding part 502. Accordingly, at least one portion of the third edge 513c can be arranged to be spaced apart from and face the bonding part 502. At least a portion of the third edge 513c can be arranged to face a bent portion, for instance, an inner corner of the bonding part 502.

The third edge 513c can be divided into a first portion 513c1, a second portion 513c2, and a third portion 513c3 in accordance with overlapping or non-overlapping with the bonding part 502. Meanwhile, the bonding part 502 can be divided into a first bonding part 502a and a second bonding part 502b bent from the first bonding part 502a. The first portion 513c1 is a portion that is adjacent to the first edge 513a and is overlapped with the first bonding part 502a. The third portion 513c3 is a portion not overlapped with the bonding part 502. The second portion 513c2 is a portion that is adjacent to the second edge 513b and is overlapped with the second bonding part 502b. Through the third portion 513c3, a top surface of the first substrate 523 can be exposed. Accordingly, an opening can be provided between the bonding part 502 and the third edge 513c. That is, a space opened between the bonding part 502 and the first polarization plate 513, i.e., an air channel 703 can be provided through the third portion 513c3. The third edge 513c can be formed as at least a part of the air channel 703. Through the air channel 703, a space (or a space making a flow of air available) in which air can go in and out between the bonding part 502 and the first polarization plate 513 can be secured. Meanwhile, the cutting area 513d of the first polarization plate 513 can be formed as at least a part of the air channel 703. That is, a cut-out portion of the first polarization plate 513 can form the air channel 703. According to various exemplary embodiments, the term 'air channel' used in the present document can be used interchangeably with an air path or an opening.

A shape of the air channel 703 can vary depending on a shape of the third edge 513. For example, the type of the air channel 703 can be a triangle when viewed from above. The bonding part 502 can correspond to a bottom side and height of the triangle, and the third edge 513 can correspond to an oblique side of the triangle.

According to various exemplary embodiments, the bonding part 502 can include the air channel 703. The air channel 703 can be formed in a plurality of sides of the display 503 and at least a part of the external area 501b of the cover window 501. Through the air channel 703, a flow of air can be made between the internal area 501a of the cover window 501 and an external area of the display 503.

Various exemplary embodiments of the present disclosure can improve an undesired phenomenon of generating a watermark. The watermark is a phenomenon of generating a mark acknowledged like an oil film or a water film formed as an inner surface of the cover window 501 and a surface of the polarization plate 513 come into contact with each other. That is, the watermark is an oily looking area appearing due to the deformation of the cover window 501, a liquid crystal characteristic of the display 503, a surface characteristic of the polarization plate 513, etc. at a time an external force is applied to the cover window 501. The watermark does not appear when a gap between the cover window 501 and the polarization plate 513 is enough but, when bending takes place by an external force, the watermark momentarily takes place at a contact point to which the external force is applied. Also, when permanent bending takes place by an external force, or an external force is applied in a state in which a space between the cover window 501 and the display 503 is sealed up, the watermark can appear a considerable period of time or permanently. In the electronic device according to various exemplary embodiments, the air channel 703 can be provided in both directions of X axis and Y axis with respect to the bonding part 502 and thus, can decrease a possibility of a phenomenon of air channel 703 clogging by an assembly tolerance or component tolerance. Accordingly, the air channel 703 can improve the quality uniformity of the electronic device.

Also, as illustrated in FIG. 7 and FIG. 8, a process of forming a conductive member, for example, an Ag dot 701 can be performed through the air channel 703. That is, an electrode formed in at least a partial area of a color filter glass and an electrode formed in at least a partial area of a TFT glass can be coupled to each other through the conductive member in an area (for example, the air channel 703) corresponding to the third edge 513c. For example, the Ag dot 701 being the conductive member can electrically couple a ground electrode arranged on the first substrate 523 with the second substrate 533. The Ag dot 701 can be formed of silver paste so that it may eliminate static electricity generated from the external. Also, the air channel 703 can prevent electrical shorting by a contact between the Ag dot 701 and the first polarization plate 513. That is, a space is secured by the third edge 513c, thereby being able to prevent the contact between the Ag dot 701 and the first polarization plate 513.

Also, because the Ag dot 701 can be formed through the air channel 703, one length of the first polarization plate 513 can be increased. That is, a length of a Y axis of the first polarization plate 513 can be increased. Accordingly, a step (S) formed by the first polarization plate 513 and the first substrate 523 can decrease in size. This can lead to the improvement of the pooling phenomenon. The pooling phenomenon is a phenomenon in which it is acknowledged that a liquid crystal layer is waved like a wave around a point at which the cover window 501 is pressed with a user's hand. That is, the pooling phenomenon is a phenomenon in which momentary and local display abnormality takes place as an array of a liquid crystal layer within a cell of the display 503 is scattered by an external force applied at a time a surface of the display 503 is pressed. Bruising can denote a phenomenon of display abnormality taking place just beneath a point to which an external force is applied, and pooling can denote a phenomenon of display abnormality taking place around the point to which the external force is applied. The pooling mainly takes place when a structure capable of pressurizing the display 503 is arranged around the point to which the external force is applied. In this aspect, an exterior part of an effective display area of the electronic device is a portion structurally vulnerable to the pooling. In an aspect of an internal structure of the display 503 or in an aspect of a shape of the bonding part 502, a direction in which the driving chip 507 of the display 503 is located can be a vulnerable portion. In the electronic device according to various exemplary embodiments, the Y-axis length of the first polarization plate 513 can be increased by virtue of the air channel 703, and the step (S) formed by the first polarization plate 513 and the first substrate 523 can be decreased in size. That is, by decreasing the size of the step (S), each element can be continuously laminated near the driving chip 507, and an external force applied to the touch window 501 can be delivered inside the display 503 in a straight-line manner. Accordingly, this pooling phenomenon can be improved.

FIG. 9 to FIG. 12 illustrate the first polarization plate 513 included in the electronic device according to various exemplary embodiments.

Figure 9:
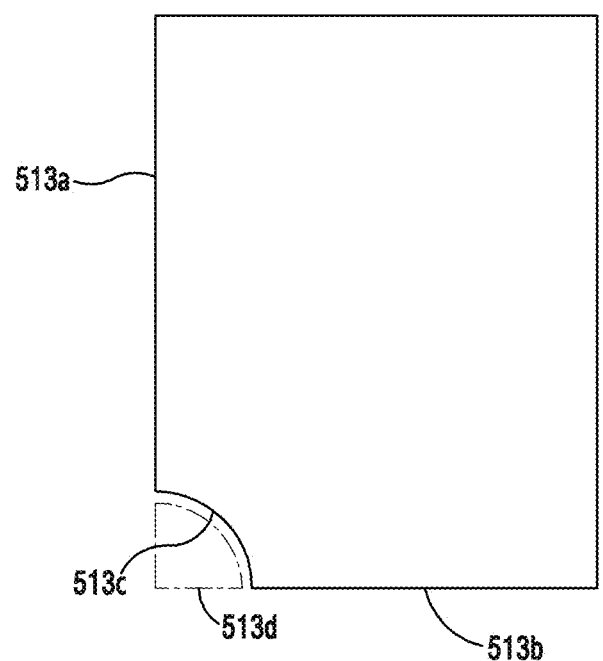
FIG. 9 to FIG. 12 illustrate a first polarization plate included in an electronic device according to various exemplary embodiments.

According to various exemplary embodiments, as illustrated in FIG. 9, the third edge 513c can include a curved line. The third edge 513c can be of a shape that is concavely dent inside the first polarization plate 513.

According to various exemplary embodiments, as illustrated in FIG. 9, the first polarization plate 513 can include a cutting area 513d formed by cutting out at least one corner among one or more corners. That is, the cutting area 513d is a portion that is cut out from the first polarization plate 513. The cutting area 513d can be of a fan shape.

Figure 10:
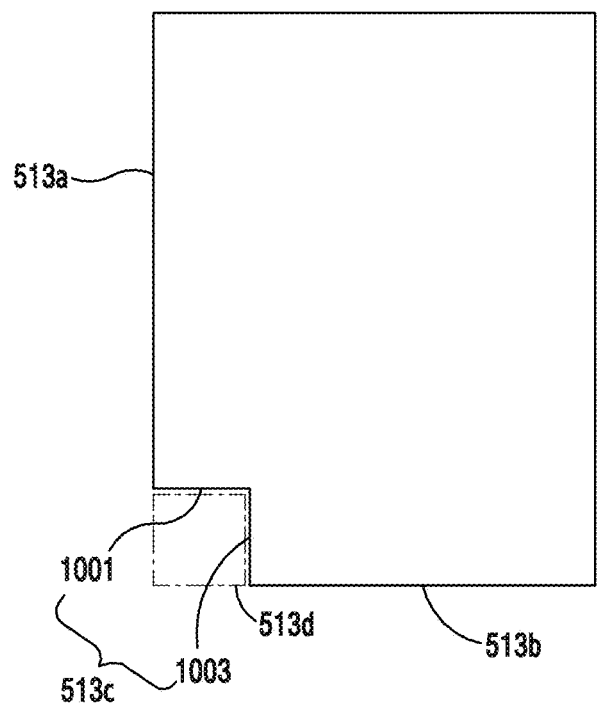

According to various exemplary embodiments, as illustrated in FIG. 10, the third edge 513c can include a first sub edge 1001 and a second sub edge 1003 each having a different slope. The first sub edge 1001 and the second sub edge 1003 can be straight lines, respectively. The first sub edge 1001 can have a slope different from those of the adjacent first edge 513*a* and second sub edge 1003. The second sub edge 1003 can extend from the first sub edge 1001. The second sub edge 1003 can have a slope different from those of the adjacent first sub edge 1001 and second edge 513*b*.

According to various exemplary embodiments, as illustrated in FIG. 10, the first polarization plate 513 can include a cutting area 513*d* formed by cutting out at least one corner among one or more corners. That is, the cutting area 513*d* is a portion that is cut out from the first polarization plate 513. The cutting area 513*d* can be of a square shape.

Figure 11:
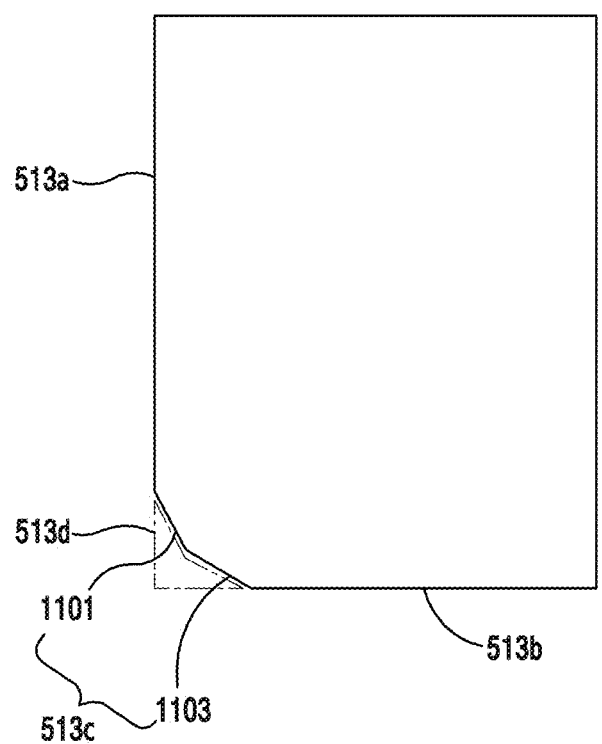

According to various exemplary embodiments, as illustrated in FIG. 11, the third edge 513*c* can include a first sub edge 1001 and a second sub edge 1003 each having a different slope. The first sub edge 1001 and the second sub edge 1003 can be straight lines, respectively. The first sub edge 1001 and the second sub edge 1003 can have different slopes, respectively. The first sub edge 1001 and the second sub edge 1003 can be oblique lines with respect to the first edge 513*a* and the second edge 513*b*.

According to various exemplary embodiments, as illustrated in FIG. 11, the first polarization plate 513 can include a cutting area 513*d* formed by cutting out at least one corner among one or more corners. That is, the cutting area 513*d* is a portion that is cut out from the first polarization plate 513. The cutting area 513*d* can be of a polygonal shape.

Figure 12:
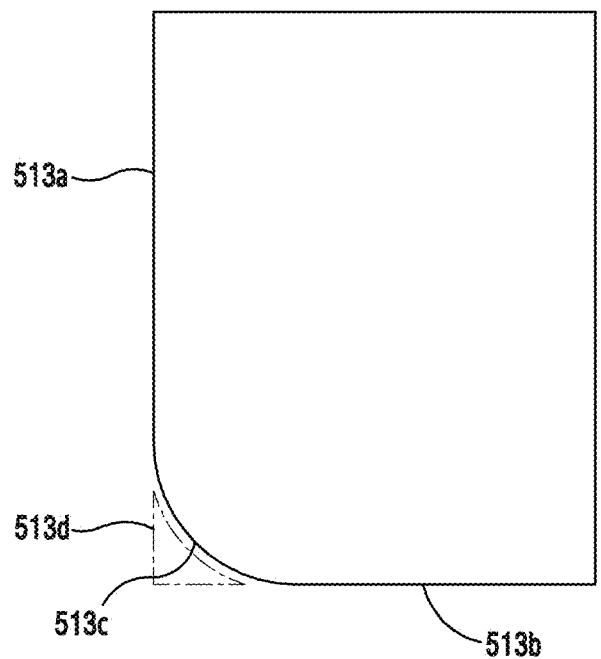

According to various exemplary embodiments, as illustrated in FIG. 12, the third edge 513*c* can include a curved line. The third edge 513*c* can be of a shape that is convex outside the first polarization plate 513.

According to various exemplary embodiments, as illustrated in FIG. 12, the first polarization plate 513 can include a cutting area 513*d* formed by cutting out at least one corner among one or more corners. That is, the cutting area 513*d* is a portion that is cut out from the first polarization plate 513. The cutting area 513*d* can be of various shapes.

Besides, the first polarization plate 513 can include the third edge 513*c* of various shapes capable of forming the air channel 703.

Figure 13:
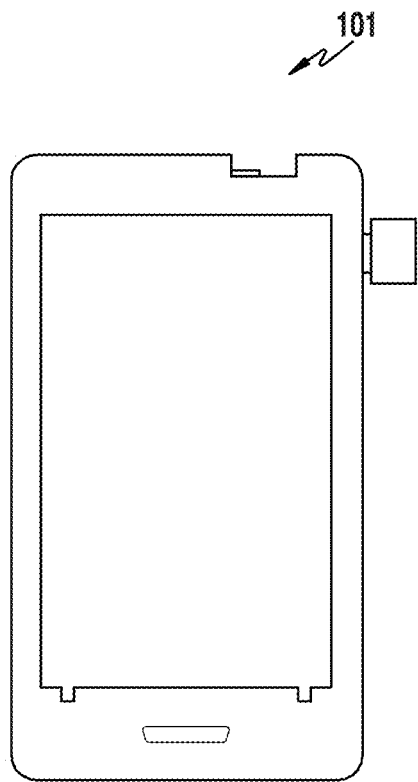
FIG. 13 illustrates a front view of an electronic device according to various exemplary embodiments.
Figure 14:
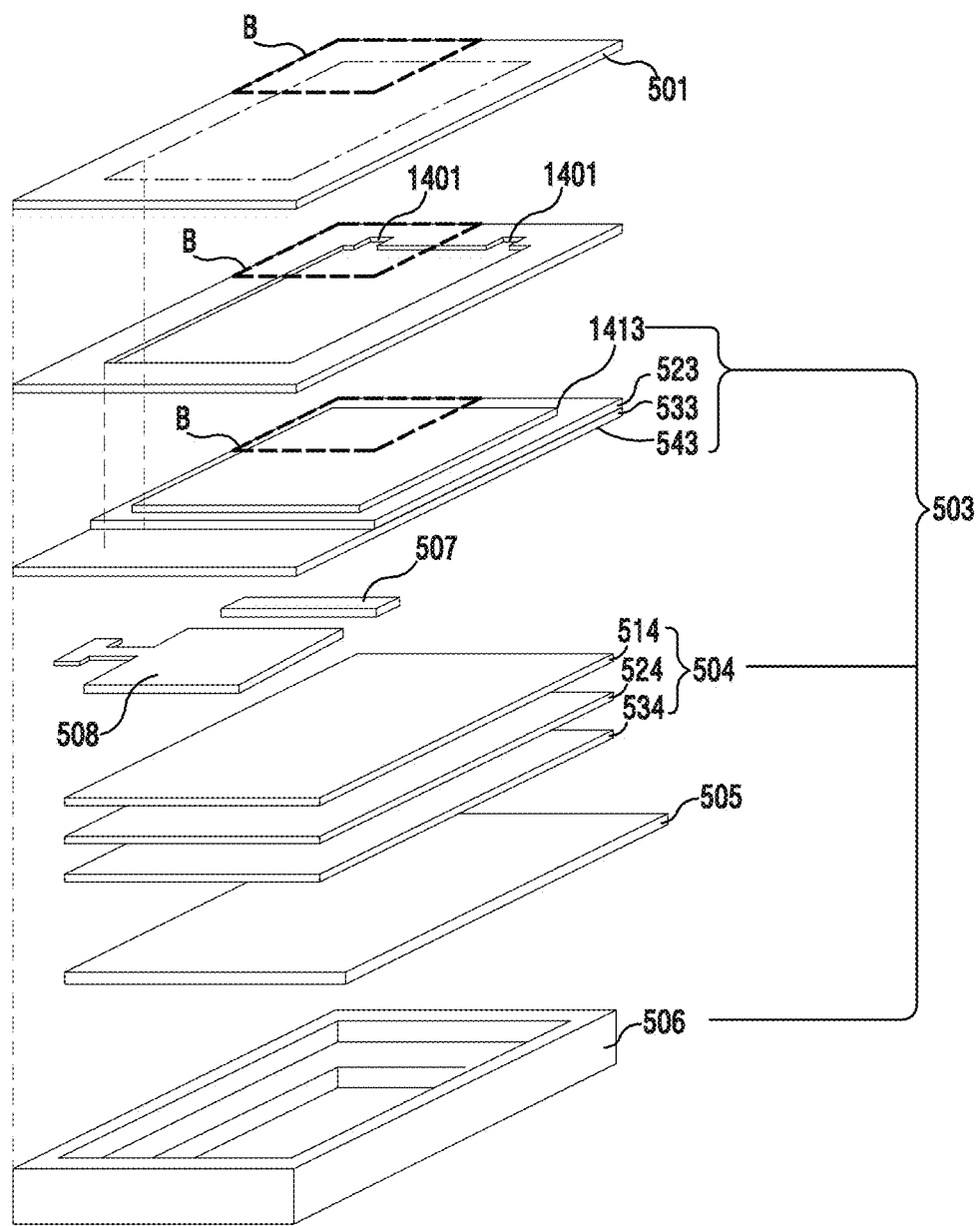
FIG. 14 illustrates an exploded view of a construction of an electronic device according to various exemplary embodiments.
Figure 15:
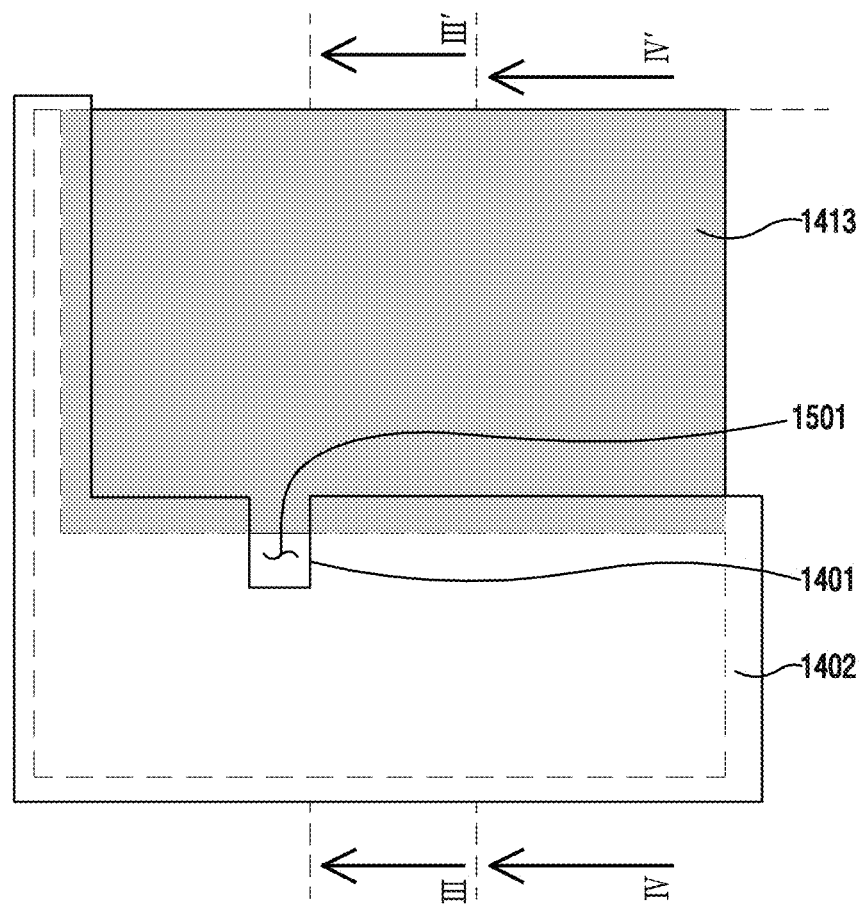
FIG. 15 illustrates an enlarged view of a portion 'B' of FIG. 14.
Figure 16:
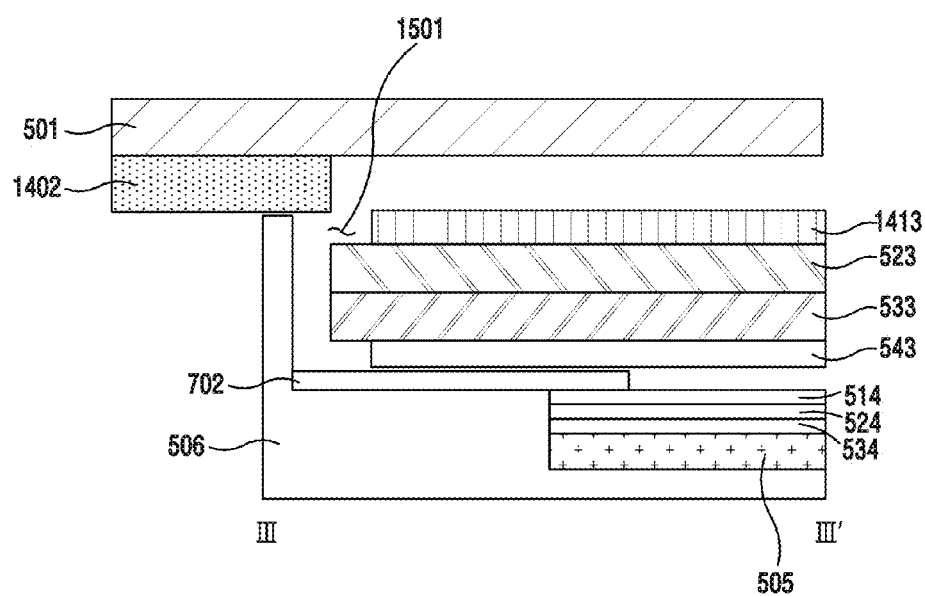
FIG. 16 illustrates a section taken along line III-III' of FIG. 15.
Figure 17:
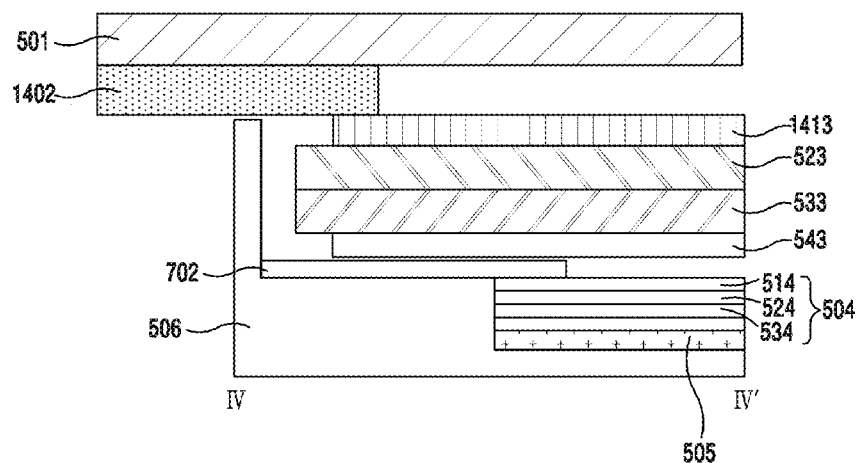
FIG. 17 illustrates a section taken along line IV-IV' of FIG. 15.

An electronic device according to various exemplary embodiments is described with reference to FIG. 13 to FIG. 17. A detailed description of the same construction as the above described construction is omitted. FIG. 13 illustrates a front view of the electronic device according to various exemplary embodiments. FIG. 14 illustrates an exploded view of a construction of the electronic device according to various exemplary embodiments. FIG. 15 illustrates an enlarged view of a portion 'B' of FIG. 14. FIG. 16 illustrates a section taken along line III-III' of FIG. 15. FIG. 17 illustrates a section taken along line IV-IV' of FIG. 15.

As illustrated in FIG. 13 and FIG. 14, the electronic device 101 according to various exemplary embodiments includes a bonding part 1402, and the bonding part 1402 can include an open hole 1401. The open hole 1401 can be provided in an edge area of the bonding part 1402. At least one or more open holes 1401 can be provided in the edge area of the bonding part 1402. For example, as illustrated in FIG. 14, two open holes 1401 can be provided in the edge area of the bonding part 1402. The open hole 1401 can have a groove shape. The open hole 1401 can have a concave ruggedness shape.

The first polarization plate 1413 can be adhered to the bonding part 1402. The first polarization plate 1413 can have a square shape.

As illustrated in FIG. 15 and FIG. 16, a top surface of the first substrate 523 can be exposed by the open hole 1401. An opening can be provided between the bonding part 1402 and the first polarization plate 1413 by the open hole 1401. That is, a space (i.e., air channel 1501) opened between the bonding part 1402 and the first polarization plate 1413 can be provided through the open hole 1401. Through the air channel 1501, a space in which air can go in and out between the bonding part 1402 and the first polarization plate 1413 can be secured.

The air channel 1501 of the electronic device according to various exemplary embodiments can prevent the occurrence of a watermark.

According to various exemplary embodiments, an electronic device can include a display 503, a window 501, and a bonding part 502. The display 503 can include a plurality of sides. The window 501 can include an internal area 501*a* of an inside coupled with the plurality of sides and an external area 501*b* of an outside of the internal area 501*a*. The bonding part 502 can include an air path 703. The air path 703 can be formed in the plurality of sides and at least a partial area of the external area 501*b*, and can be adapted to a flow of air between the internal area 501*a* and an external area of the display 503 in at least a part coupled with the plurality of sides.

According to various exemplary embodiments, the display 503 can include one or more corners formed by the meeting of two or more sides among a plurality of sides, and include a cutting area 513*d* formed by cutting at least one corner among the one or more corners.

According to various exemplary embodiments, the cutting area 513*d* can be formed as at least a part of the air path 703.

According to various exemplary embodiments, the display 503 includes the polarization plate 513, and the cutting area 513*d* formed by cutting out at least one corner of the polarization plate 513 can be formed as at least a part of the air path 703.

According to various exemplary embodiments, the display 503 further includes a color filter glass 523 and a TFT glass 533. An electrode formed in at least a partial area of the color filter glass 523 and an electrode formed in at least a partial area of the TFT glass 533 can be coupled by a conductive member 701 in an area corresponding to the cutting area 513*d*.

According to various exemplary embodiments, the conductive member 701 can be electrically coupled with the electronic device.

According to various exemplary embodiments, the bonding part 502 can be formed along shapes of one or more corners, and the air path 703 can include a space 703 provided between the cutting area 513*d* and the bonding member 502.

In an electronic device according to various exemplary embodiments, a polarization plate can include a first edge, a second edge and a third edge, and an air channel can be formed between the third edge and a bonding part. This can lead to the improvement of generation of a watermark or oiling. Also, the air channel can be formed in both directions of X axis and Y axis with respect to the bonding part, so the air channel can decrease a possibility of a phenomenon of air channel clogging caused by an assembly tolerance or a component tolerance. Accordingly, the air channel can improve the quality uniformity of the electronic device.

Also, the air channel can prevent an appearance inferiority caused by a contact between an argentum (Ag) dot and a polarization plate at the time of forming the Ag dot. That is, a space is secured by the third edge, thereby being capable of preventing the contact between the Ag dot and the polarization plate.

Also, the air channel can increase a Y-axis length of the polarization plate, and can decrease a size of a step formed by the polarization plate and a substrate, thereby improving a pooling phenomenon.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a display comprising a plurality of sides;
a window comprising an internal area of an inside coupled with the plurality of sides and an external area of an outside of the internal area; and
a bonding member comprising an air path formed in the plurality of sides and at least a partial area of the external area, and adapted to a flow of air between the internal area and an external area of the display in at least a part coupled with the plurality of sides.

2. The electronic device of claim 1, wherein the display comprises one or more corners formed by a meeting of two or more sides among the plurality of sides, and comprises a cutting area formed by cutting out at least one corner among the one or more corners.

3. The electronic device of claim 2, wherein the cutting area is formed as at least a part of the air path.

4. The electronic device of claim 2, wherein:
the display comprises a polarization plate, and
the cutting area formed by cutting out at least one corner of the polarization plate is formed as at least a part of the air path.

5. The electronic device of claim 4, wherein the display further comprises a color filter glass, a Thin Film Transistor (TFT) glass, and an electrode formed in at least a partial area of the color filter glass and an electrode formed in at least a partial area of the TFT glass are coupled to each other by a conductive member in an area corresponding to the cutting area.

6. The electronic device of claim 4, wherein the cutting area comprises a fan shape, a square shape, a polygonal shape, a groove shape.

7. The electronic device of claim 5, wherein the conductive member is electrically coupled with the electronic device.

8. The electronic device of claim 2, wherein the bonding member is formed along shapes of the one or more corners, and the air path comprises a space provided between the cutting area and the bonding member.

9. The electronic device of claim 8, wherein the cutting area comprises a fan shape, a square shape, a polygonal shape, a groove shape.

10. The electronic device of claim 2, further comprising a driving chip driving the display, and
the cutting area is adjacent to the driving chip.

11. A display device comprising:
a cover window;
a display arranged under the cover window, and comprising a polarization plate; and
a bonding part arranged between the cover window and the display,
wherein the polarization plate comprises a first edge, a second edge and a third edge each having a different slope.

12. The display device of claim 11, wherein the bonding part is overlapped with a part of the third edge.

13. The display device of claim 11, wherein at least a part of the third edge is spaced apart from the bonding part.

14. The display device of claim 11, comprising an air channel between the bonding part and the third edge.

15. The display device of claim 11, wherein:
the bonding part comprises a first bonding part and a second bonding part bent from the first bonding part, and
the third edge comprises a first portion overlapped with the first bonding part, a second portion overlapped with the second bonding part, and a third portion arranged between the first portion and the second portion.

16. The display device of claim 11, wherein at least one or more third edges are provided in the polarization plate.

17. The display device of claim 11, wherein the third edge comprises a straight line or a curved line.

18. The display device of claim 11, wherein the third edge comprises a first sub edge and a second sub edge each having a different slope.

19. The display device of claim 14, further comprising an Argentum (Ag) dot in the air channel.

20. The display device of claim 11, further comprising a driving chip driving the display, and
the third edge is adjacent to the driving chip.

* * * * *